United States Patent
Clark et al.

(10) Patent No.: US 8,305,926 B2
(45) Date of Patent: Nov. 6, 2012

(54) METHOD AND APPARATUS FOR SELF-LEARNING OF CALL ROUTING INFORMATION

(75) Inventors: Christine Yu-sha Chou Clark, Matawan, NJ (US); Sekar Ganesan, Tinton Falls, NJ (US); Leticia Garcia Johnson, Arvada, CO (US); Richard J. Sullivan, Spring Lake, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2340 days.

(21) Appl. No.: 10/235,187

(22) Filed: Sep. 4, 2002

(65) Prior Publication Data
US 2004/0042469 A1 Mar. 4, 2004

(51) Int. Cl.
*H04L 12/28* (2006.01)
(52) U.S. Cl. .......................................... 370/254; 370/401
(58) Field of Classification Search ........................ None
See application file for complete search history.

(56) References Cited

U.S. PATENT DOCUMENTS

| | | | | |
|---|---|---|---|---|
| 3,564,149 A * | 2/1971 | Funk et al. | | 379/222 |
| 5,493,573 A * | 2/1996 | Kobayashi et al. | | 370/236 |
| 5,559,877 A * | 9/1996 | Ash et al. | | 379/201.05 |
| 5,583,929 A * | 12/1996 | Ardon | | 379/230 |
| 5,598,458 A * | 1/1997 | Bales et al. | | 379/219 |
| 5,999,604 A * | 12/1999 | Walter | | 379/133 |
| 6,069,947 A * | 5/2000 | Evans et al. | | 379/229 |
| 6,298,043 B1 * | 10/2001 | Mauger et al. | | 370/248 |
| 6,385,196 B1 * | 5/2002 | Hayball et al. | | 370/356 |
| 6,496,502 B1 * | 12/2002 | Fite et al. | | 370/389 |
| 6,496,508 B1 * | 12/2002 | Breuckheimer et al. | | 370/397 |
| 6,560,236 B1 * | 5/2003 | Varghese et al. | | 370/401 |
| 6,570,868 B1 * | 5/2003 | Cable et al. | | 370/351 |
| 6,597,684 B1 * | 7/2003 | Gulati et al. | | 370/351 |
| 6,650,646 B1 * | 11/2003 | Galway et al. | | 370/397 |
| 6,724,876 B2 * | 4/2004 | Williams et al. | | 379/207.02 |
| 6,765,866 B1 * | 7/2004 | Wyatt | | 370/229 |
| 6,807,172 B1 * | 10/2004 | Levenson et al. | | 370/389 |
| 6,816,464 B1 * | 11/2004 | Scott et al. | | 370/252 |
| 2001/0028706 A1 * | 10/2001 | Nolting | | 379/134 |
| 2002/0037006 A1 * | 3/2002 | Sampath et al. | | 370/389 |
| 2002/0054595 A1 * | 5/2002 | Ambe et al. | | 370/390 |
| 2002/0176548 A1 * | 11/2002 | Watts | | 379/88.17 |
| 2003/0105865 A1 * | 6/2003 | McCanne et al. | | 709/225 |
| 2003/0118169 A1 * | 6/2003 | Savoor et al. | | 379/219 |
| 2003/0161296 A1 * | 8/2003 | Butler et al. | | 370/352 |
| 2003/0169867 A1 * | 9/2003 | Nekrasovskaia et al. | | 379/229 |
| 2003/0235282 A1 * | 12/2003 | Sichelman et al. | | 370/352 |
| 2004/0042600 A1 * | 3/2004 | Tripathi et al. | | 379/201.12 |
| 2004/0062210 A1 * | 4/2004 | Genter et al. | | 370/260 |
| 2005/0141550 A1 * | 6/2005 | Mauger et al. | | 370/465 |

* cited by examiner

*Primary Examiner* — Timothy J Weidner

(57) ABSTRACT

The present invention is directed to a method and apparatus for learning call routing information in a communication system. A switching architecture is presented. The switch may be implemented in a centralized architecture or a distributed architecture. In addition, the switch may be implemented in a variety of networks such as a circuit-switched network or a packet-switched network. The switch includes a policy server and a self-learning application server. The policy server includes routing information for routing calls across the switch. The routes for incoming and outgoing calls are analyzed as they pass through the switch. The self-learning application server uses artificial intelligence techniques and caching algorithms to learn new more-efficient routing paths or initial routing paths based on the incoming and outgoing calls. The self-learning application server then updates the policy server with the new learned routes.

22 Claims, 4 Drawing Sheets

METHOD AND APPARATUS FOR SELF-LEARNING OF CALL ROUTING INFORMATION

BACKGROUND OF THE INVENTION

1. Field of the Invention

This invention relates to infrastructure. Specifically, the present invention relates to communication infrastructure.

2. Description of the Related Art

Modern voice-based communication systems include circuit-switched systems and packet-switched systems. In circuit-switched systems, a circuit (e.g., one path) is established between end-users. The end-users have exclusive use of the circuit until the connection is released. In a packet-switched system, communication is also established between end-users. Messages transmitted between the end-users are segmented into packets. The packets may take different paths across the network.

In a conventional telephony system, communication is established between an end-user and switching hardware. The switching hardware may be a private branch exchange or it may be a switch located in a central office. The central office may be able to switch a call directly to a second end-user if the second end-user is connected to the central office. In the alternative, the call may be switched through an edge switch to a Public Switched Telephone Network (PSTN). Ultimately, the call reaches the second end-user.

Calls are switched based on the incoming call number, the outgoing call number, and several other parameters. Different communication links or trunks are associated with specific call numbers. A call is switched from one trunk to a different trunk to complete the call or to establish a connection. The trunks are typically linked together in a group known as a trunk group, where a trunk group is a group of trunks that can receive calls directed to a common set of phone numbers. When a call arrives at the trunk group, the switch searches (e.g., hunts) for an available trunk in the group and connects the call to that available outgoing trunk.

In order to accurately locate and switch calls in the PSTN, a numbering plan known as the North American Numbering Plan (NANP) (e.g., NPA-XXXX) is implemented in North America. However, as the name implies, there are other numbering plans in other areas of the world. In the NANP, end-users are given a specific number and the number is used to locate end-users and route calls in the network.

Routes used to access end-users may be dynamic. For example, network reconfigurations may change the route to an end-user or one path may be congested and there is a better alternative route. Therefore, routes are continually changing and updated in the network.

Switches that operate within the PSTN are often implemented as large mainframe computers or distributed workstations. Both implementations frequently use Operations Systems (OS) to function. One such OS is the routing OS, which instructs the switch on how to make a call. For example, a switch's routing translation (e.g., routing data that is stored in the switch), which contains the latest routing data, is typically loaded and updated by a routing OS.

Routing OS systems are very complex. They operate by deriving routing data, provisioning that routing data into switches in the network and coordinating the provisioning across switches such that the provisioning occurs in the correct sequence. The routing OS accepts feeds from industry databases (e.g., Local Exchange Routing Guide), as well as from other internal OS's (e.g., trunk planning, number assignment, etc.). There is a tremendous amount of logic associated with a routing OS. The routing OS is used to derive the appropriate routes across the network and then the routing OS loads the routing data into the switches. Today's switches are dependent on these complex routing OS as are the deployment of new services that depend on the routing OS.

Updating routing information using the routing OS introduces tremendous overhead and inefficiencies. For example, the translations in each switch must remain current; therefore, there is significant traffic associated with continually downloading and updating switches. In addition, since the network is constantly changing, keeping the routing OS current and updating the translations in each switch, in a timely manner, becomes a burdensome task. Should the switch translations fail to stay current, calls go uncompleted, which ultimately results in dissatisfied end-users and loss of revenue for the operating company.

Implementing network technologies, which depend on the routing OS, is an arduous task. The routing OS and the translations are often the most time-consuming aspects of implementing a network. New technologies are being developed that reduce the time to market for technology designers. However, even with the new technologies, one of the most time-consuming aspects of deploying a network is implementing the routing OS and the translations. Therefore, implementing the routing OS and translations in a network is an impediment to the quick and efficient deployment of advancing technologies.

Conventional voice communications are continually advancing. For example, packet-switched communications of voice calls have developed. Two approaches worthy of note include datagram communications and virtual circuit communications. In both forms of packet switching, voice signals are first digitized and segmented into packets. In virtual circuit communications, the packets follow a path that is established between two end-users. This may be considered a circuit-switched call that uses packets. In datagram technology, each packet is an individual unit and may follow its own path across the network from a sending end-user to a receiving end-user.

With the explosion of the Internet, voice-based communications are no longer just going over traditional voice communications networks, but are now going over the Internet. In the past, Internet networks were synonymous with data networks and the PSTN was considered a voice network. The lines between the Internet and traditional voice networks (e.g., PSTN) have blurred.

Conventional Internet protocols, such as the Transmission Control Protocol (TCP)/ Internet protocol (IP), have been adjusted to accommodate voice. As a result, technologies such as Voice-over-IP have emerged. One of the objectives of Voice-over-IP technology is to provide end-users with the ability to make telephone calls (e.g., as in the PSTN) over IP-based data networks, with a reasonable quality of service. However, the problems associated with maintaining and distributing routing information are also present. Therefore, some of the potential of Voice-over-IP is diminished since the problems associated with the routing OS are still present.

In addition to changes in the method of making voice-based calls (e.g., Voice-over-IP), the hardware used to make voice-based calls has changed. The hardware that was once used to make voice-based calls may now be implemented in software. For example, a voice-switching platform known as a softswitch is available.

A softswitch, as defined by the International Softswitch Consortium, is a software-based entity that provides call control functionality. A softswitch typically includes a Call agent (e.g., media gateway controller, softswitch), Media gateway, Signaling gateway, Feature server, Application server, Media server, and Management, provisioning and billing interfaces. A call agent provides the call logic or call control signaling for one or more media gateways. The media gateway transforms media from one transmission format to another. The signaling gateway encapsulates and transports PSTN signaling protocols over IP. The feature server provides enhanced call control services, such as network announcements, 3-way calling, call waiting, etc. The application server provides the service logic and execution for one or more applications. The media server performs media processing on packet media streams. The management, provisioning and billing interfaces provide management provisioning and billing functionality.

The components of a softswitch may be located in a single unit or may be distributed. While softswitch technology provides for more flexibility and speed in implementing communication networks, there is processing overhead required in updating the different components of a softswitch. For example, the conventional methods of updating the routing OS are once again, a time-consuming and arduous task when implementing a softswitch.

Maintaining the routing OS and translations become challenging when routing is dynamic. In a number of technologies, the call routing path changes based on the technology. Therefore, call routes need to be updated with significant frequency and, as a result, there is the associated need to update the translations. For example, in Wireless Technologies, as end-users move around (e.g., roam) with a mobile handset, the end-user may access the network through different entry points. As a result, the call routing paths are continually changing.

In systems implementing Local Number Portability (LNP), a similar activity occurs. LNP is a circuit-switched network capability, which allows an end-user to change a service provider and/or service type without changing their phone number. A location Routing Number (LRN) is used to implement the LNP technology. LRN is a 6-digit number used to uniquely identify a switch that has ported numbers (e.g., LNP numbers). LRN assigns the unique 6-digit routing number to each switch in a defined geographic area. As a result, the LRN serves as a network address. Carriers routing telephone calls to end-users that have transferred their telephone numbers from one carrier to another perform a database query to obtain the LRN that corresponds to the dialed telephone number. The carrier then routes the call to the new carrier based on the LRN.

As voice networks have incorporated these various technologies and there is quicker time to market, the use of traditional methods to update network routing, such as receiving an industry feed to the routing OS and then downloading the routing OS to the switches in the network, serves as a continuing impediment to the quick deployment of networks. The routing OS technology limits the ability of a designer to take advantage of the full potential of the new technology.

Thus, there is a need in the art for a method of learning, managing and maintaining valid call routes in a voice network. There is a need in the art for a method and apparatus for learning, managing and maintaining valid call routes across diverse and evolving technologies. There is a need in the art for a method and apparatus for optimizing routing in a network with dynamic and changing numbers and network entry points. There is a need in the art for a method and apparatus which performs routing and updating of translations, taking advantage of new technologies, while reducing time to market.

SUMMARY OF THE INVENTION

A network architecture is presented. The network architecture includes a switch for processing voice traffic. Calls are connected between end-users by traversing network components on an ingress side of a network switch, through the network switch and then out on an egress side of the network switch. For example, calls are connected across an ingress central office switch, an ingress edge switch, a network switch including one-way or two-way trunk groups, an egress edge switch and an egress central office. The network switch includes ingress gateways for receiving incoming calls from the ingress edge switch, a switching fabric for switching the calls and egress gateways for communicating outgoing calls to the egress edge switch. Calls are switched in the switching fabric based on routing information defined by a policy server. The policy server may be housed in the network switch or housed external to the network switch. The policy server maintains, manages and receives routing updates based on artificial intelligence algorithms operating in a self-learning application server. The self-learning application server identifies routing patterns and efficiencies based on the incoming and outgoing calls. Further, the self-learning application server identifies and manages problem calls.

In one embodiment of the present invention, a switch comprises an ingress port receiving an incoming call; a first server storing routing information; a switching fabric coupled to the ingress port and coupled to the first server, the switching fabric generating a switched call by switching the incoming call in response to the routing information; an egress port coupled to the switching fabric, the egress port communicating an outgoing call in response to the switched calls; and a second server coupled to the first server, the second server generating learned information in response to the routing information stored in the first server. In different embodiments of the present invention, the switch may be implemented with a centralized architecture or as a distributed architecture. The learned information may be learned using simple caching, complex caching or artificial intelligence techniques. The first server may be implemented as a policy server. The second server may be implemented as a self-learning application server. The egress port may be coupled to a one-way trunk group.

In another embodiment a switch comprises a switching fabric switching calls and a server coupled to the switching fabric, the server learning routes in response to the switching fabric switching the calls.

A method of operating a system comprises the steps of receiving call detail records; querying for ported numbers in response to the call detail records; learning routes in response to the call detail records and in response to the ported numbers; and provisioning learned routes in response to learning the routes.

A method of operating a system comprises the steps of receiving a call query; querying for ported numbers in response to the call query; learning routes in response to querying for the ported numbers; and provisioning learned routes in response to learning the routes.

A method of operating a policy server, the policy server including routing information, the method comprising the steps of learning routes and updating the routing information in response to learning the routes.

A method of learning routes comprises the steps of analyzing a call detail record and learning routes in response to analyzing the call detail record.

A system comprises a gateway receiving an incoming call; a network file server coupled to the gateway and storing call detail record information in response to the incoming call received by the gateway; a local number portability server storing local number portability information; a self-learning application server coupled to the network file server and coupled to the local number portability server, the self-learning application generating learned information by querying the local number portability server in response to the call detail record information stored in the network file server; and a policy server coupled to the self-learning application server, the policy server storing routing information in response to the learned information generated by the self-learning application.

A method of operating a server comprises the steps of receiving call detail record information; generating query information in response to the call detail record information; receiving local number portability information in response to generating the query information; generating learned information by running artificial intelligence routines in response to the local number portability information; and generating route information in response to the learned information.

A method of managing a call comprises the steps of analyzing a call detail record associated with a route, the call detail record including an originating line identity code; identifying the originating line identity code; and not learning the route in response to identifying the originating line identity code.

A method of managing a call comprises the steps of receiving a call; checking to determine if the call is ported; identifying a location routing number in response to checking to determine if the call is ported; and learning the location routing number.

A method of managing a call comprises the steps of analyzing a first route; identifying a first frequency of number changes in response to checking the first route; analyzing a second route; identifying a second frequency of number changes in response to checking the second route; and determining whether to learn in response to the first frequency of number changes and in response to the second frequency of number changes.

A method of learning a route comprises the steps of generating a route list, the route list including a plurality of invalid routes; generating a valid route by switching a call in response to the plurality of invalid routes; and learning the valid route.

DESCRIPTION OF THE INVENTION

Figure 1:
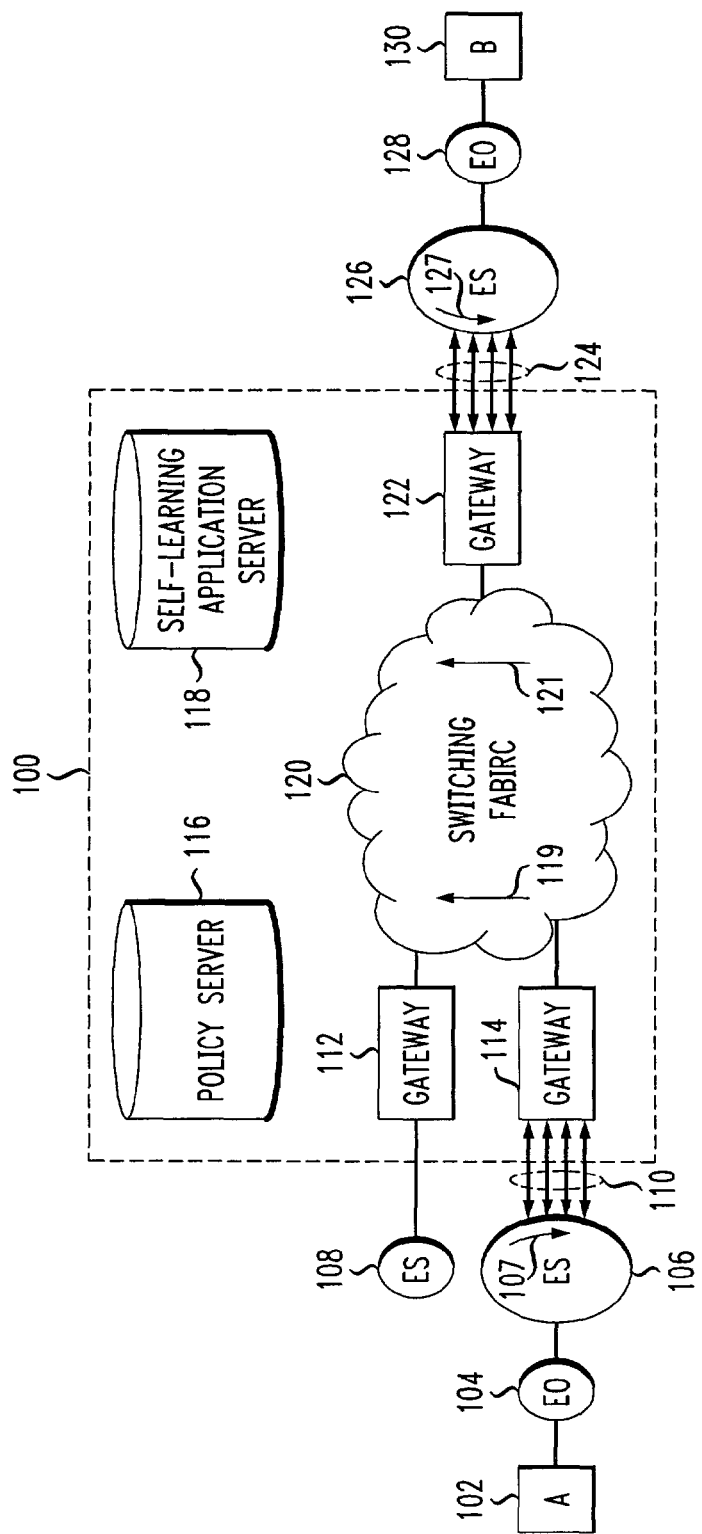
FIG. 1 displays a switch including a two-way trunk group, which implements the method and apparatus of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

A method and apparatus are presented for learning and implementing call routing in a communication network. The method and apparatus of the present invention may be applied in both circuit-switched and packet-switched networks. In accordance with the teachings of the present invention, a self-learning methodology is applied to communication networks including network switches with one-way trunk groups and network switches with two-way trunk groups.

In one embodiment of the present invention, the method and apparatus of the present invention is implemented in a network switch, such as a softswitch, including a two-way trunk group. In another embodiment, the method and apparatus of the present invention is implemented in a network switch, such as a softswitch, including a one-way trunk group. In another embodiment, the method and apparatus of the present invention is implemented in a switch, such as a circuit switch. It should be appreciated that, while the present invention may be discussed with respect to a softswitch, the method and apparatus of the present invention would equally apply to a circuit-switching architecture or a packet-switching architecture. In addition, both centralized and distributed switch architectures are contemplated and remain within the scope of the teachings of the present invention.

In the method and apparatus of the present invention, a network switch includes a switching fabric. The switching fabric may be centralized or distributed. For example, the switching fabric may reside within a centralized network switch and switch calls from an incoming port to an outgoing port. Alternatively, the switching fabric may reside within a distributed architecture. As such, the switching fabric may be implemented as a packet-switching network within the distributed architecture. Further, the switching fabric may be located within a softswitch, within a circuit switch or within a packet switch. It should be appreciated that other switching fabrics and network switches are contemplated and remain within the scope of the present invention.

A self-learning application server is associated with the network switch and the switching fabric. The self-learning application server may reside within the network switch, be directly connected to the network switch, or communicate across a network to the network switch.

The self-learning application server may be implemented in hardware, software or in a combination of the two. For example, a multipurpose computer may be used to implement the self-learning application server; the multipurpose computer may operate based on the instructions of a computer program, or computer software. The computer software may implement logic and rules, such as artificial intelligence-based logic and rules. In addition, in another embodiment of the present invention, the logic and rules may be implemented in hardware.

The self-learning application server is coupled to the switching fabric. As such, as calls are switched or routed across the switching fabric, the self-learning application server learns the routes. The self-learning application server learns the routes using a number of techniques. In the method and apparatus of the present invention, the self-learning application server learns the routes by using simple caching, complex caching and artificial intelligence techniques.

In simple caching, the self-learning application server learns by analyzing routes, which are stored in a cache. In complex caching, the self-learning application server learns by analyzing routes, which are stored in a cache. However, in complex caching, additional requirements are placed on the routes in the cache, such as aging of routes or setting priorities on routes, etc. Lastly, the self-learning application server learns using a variety of artificial intelligence-based techniques. In one artificial intelligence-based technique, the self-learning application server observes traffic going through the network switch and analyzes the traffic to learn routes. In another artificial intelligence-based technique, the self-learning application server implements trial and error procedures and learns routes based on the trial and error procedures.

One embodiment of a network switch consistent with the teaching of the present invention includes a two-way trunk group. Calls are communicated in both directions through the network switch. As a result, the network switch is able to track and monitor call routes as the calls are processed through the switch. In the case of a softswitch, the network switch includes gateway servers on an ingress (e.g., incoming calls) side of the switch and on an egress (e.g., outgoing) side of the switch. Calls coming into the network switch on the ingress side of the switch are switched across a switching fabric to gateway servers on the egress side of the switch. It should be appreciated that in a circuit-switched implementation of the network switch, calls may be switched across the switching fabric of the network switch without traversing a gateway server.

Trunk groups connect calls from an edge switch to the gateway server or to the switching fabric in the case of a circuit-switched implementation. Typically, at least one trunk group is associated with one gateway server. End-users are connected to the edge switch through an end office, which is in communication with the edge switch. However, an end office may be directly connected to the network switch. An end-user gains access to the network through the end office. The end office communicates with the network switch through the edge switch. It should be appreciated that the end-user may also connect directly to an edge switch.

In the method and apparatus of the present invention, a policy server and a self-learning application server are located in the network switch. However, it should be appreciated that either or both the policy server and/or self-learning application server may reside outside of the network switch. For example, either or both the policy server and the self-learning application server may be connected to the network switch or may communicate across a network to the network switch. After a call comes into a gateway server on the ingress side of the network switch, the policy server and self-learning application server are accessed to determine the appropriate egress gateway or port to which to switch the call. In one embodiment of the present invention, the self-learning application server learns calls as the calls are switched using the forward path (e.g., from ingress point to egress point). In another embodiment of the present invention, the self-learning application server learns calls as calls are switched on the return path (e.g., from the egress point to the ingress point).

In one embodiment of the present invention, the policy server may be implemented as a database (e.g., translations). The database may include routing information. As calls come into an ingress point on the network switch, the dialed number (DN) may be used as an index into the policy server database to look up the route (i.e., egress gateway server and trunk group) for the call.

In another embodiment of the present invention, a Call Detail Record (CDR) is created. The call detail record includes parameters that define the nature of the call. The CDR is typically used for generating billing records. Therefore, when a call is initiated, answered and disconnected, a CDR is created. A downstream billing server reads the CDR and creates the billing record. In the method and apparatus of the present invention, the CDR is used by the self-learning application server to learn call routing. Therefore, fields within the CDR, such as trunk numbers, OLI, etc., are used by the self-learning application server to learn routes.

For example, a CDR may include Automatic Number Identification (ANI), Jurisdiction Indicator Parameter (JIP), Dialing number (DN), Originating Line Identity (OLI) code, trunk group, etc. The CDR provides a record of a call or of an event associated with a call. For example, if the softswitch instructs the gateway server to route a call destined to DN=1 out via trunk group 2, the gateway server will create a CDR with DN=1, trunk group=2. The CDR will also include other parameters, such as trunk number, ANI, OLI, JIP, etc., along with an indication of the outcome of the event (e.g., call connected, vacant code, etc.).

The self-learning application server includes a number of algorithms that may be implemented as computer instructions. The algorithms are artificial intelligence algorithms that learn and produce new routing and policy information based on information accessed from the policy server. During operation, the self-learning application server accesses the policy server. Call detail information and history information are maintained between the policy server and the self-routing application server. Routes are then analyzed based on various artificial intelligence algorithms running on the self-learning application server. As a result of the analysis, new routes are developed (e.g., learned routes) which are based on the calls traversing the switch the policy information in the policy server and the artificial intelligence-based algorithms stored in the self-learning application server. Further the self-learning application server may include logic and routing information, which enables trial and error methods. The self-learning application server may direct the switch to attempt different routes so that the self-learning application server may learn the best route.

The artificial intelligence algorithms are largely based on rules, which analyze and manipulate current incoming call information for future use in terminating calling party calls. For example, with each incoming call, the calling party number and originating switch are stored to be used by the artificial intelligence algorithms to determine potential terminating routes to the calling party number. In one embodiment of the present invention, the originating line information for each incoming call associated with the calling party number is stored and used by the artificial intelligence algorithms to identify special call types, such as cellular calls. In another embodiment, the Jurisdiction Information Parameter for each incoming call associated with the calling party number is stored and used by the algorithms to identify a potential Location Routing Number for terminating the calling party number.

In another embodiment of the present invention, the artificial intelligence algorithm analyzes the parameters of incoming calls by receiving information from the policy server, by reviewing CDRs, by monitoring signaling links, or by other means. The parameters include identification of the switches (point codes), trunk group, ANI, DN, JIP, II/OLI, etc. The artificial intelligence algorithm analyzes this data based on rules and then decides whether the route should be learned. Examples of the rules include the following: if the OLI parameter indicates cellular, do not learn; if ANI is open to portability, query LNP and learn LRN; if ANI is not cellular and not open to portability, learn first 6 digits of ANI. Learning ANI or LRN means that the AI algorithm has learned that the specific route used for this call is a valid route (in a return direction) to the ANI or LRN, and the route should be used for the routing of future calls to that ANI or LRN.

In one method of the present invention, an end-user connects with a central office. The central office forwards the call to an edge switch positioned on the ingress side of a network switch. The edge switch hunts across trunk groups attached to the edge switch for the appropriate trunk group to use for the call. The call is forwarded across a trunk group to a gateway server, which is located on the ingress side of the network switch. The network switch hunts across the gateway servers in a direction that is opposite to the direction that the edge switch hunts across the trunk groups. The policy server and the self-learning application server are accessed to determine the correct route to use in completing the call.

In one embodiment of the present invention, calls are switched between trunks connecting an edge switch on the ingress side of the network switch and gateways within the network switch. The hunt direction in the edge switch is opposite to the hunt direction across the gateway servers in the network switch. The network switch switches the calls across the switching fabric from gateway servers on the ingress side of the network switch to gateway servers on the egress side of the network switch. Trunks connect the network switch to an edge switch on the egress side of the network switch. The calls are switched across the trunks to connect with the edge switch located on the egress side of the network switch. The edge switch on the egress side of the network switch hunts across the trunks in a direction that is opposite to the direction that the network switch hunts across the gateway servers on the egress side of the network switch. The edge switch connects the call to an end office and the call is ultimately connected to an end-user.

In another embodiment of the present invention, the method and apparatus of the present invention is implemented in a one-way trunk group associated with a network switch. In a one-way trunk group implementation, a subset of the trunk groups processes calls in one direction. In the one-way trunk group architecture, calls coming into gateway servers on the ingress side of the network switch are switched to gateway servers on the egress side of the network switch. A switching fabric exists between the gateway servers on the ingress side of the network switch and the gateway servers on the egress side of the network switch.

As in the two-way trunk group implementation, a policy server and a self-learning application server are in the network switch. However, it should be appreciated that either or both the policy server or self-learning application server may be implemented outside of the network switch. After a call comes into a gateway server on an ingress gateway, the policy server and self-learning application server are accessed to determine the appropriate egress gateway.

In a one-way trunk group embodiment of the network switch, one of the gateway servers is connected to a one-way trunk group. For example, one of the gateway servers on the egress side of the network switch is connected to a one-way trunk group. The one-way trunk group may be connected in one direction to an access tandem and to end offices.

The connection between the end office and the access tandem switch often consists of identical trunks, grouped into trunk groups. A trunk group can be two-way or one-way. In the case of a two-way trunk group, the end office and the access tandem should hunt in opposite directions in order to minimize the probability of glare (e.g., glare happens when both ends of a trunk seize the trunk at the same time in an attempt to complete a call).

During operation, an end-user connects with an end office. The end office forwards the call to an edge switch positioned on the ingress side of the network switch. The edge switch searches its routing tables to select a trunk group. The edge switch then hunts across the members of the trunk group, looking for an idle trunk on which to route the call. Hunting direction is controlled on the two ends of the same trunk group, i.e., each end should hunt in a different direction. The policy server and the self-learning application server are accessed to determine the correct route to use in completing the call.

The call is switched in the network switch to gateway servers on the egress side of the network switch. The calls are then switched across trunks to connect with an edge switch located on the egress side of the network switch. The edge switch on the egress side of the network switch hunts across trunk groups in a direction that is opposite to the direction that the network switch hunts across the gateway servers.

In the one-way trunk group implementation, a subset of gateway servers (e.g., unidirectional gateway servers) on the egress side of the network switch forwards calls in one direction to a cluster of central office switches (e.g., a Local Exchange Carrier cluster). The cluster of central office switches may include an access tandem switch and several end office switches. Access tandems provide an alternate route for reaching end office switches when direct routes to the end office switches are not available. Access tandems connect to a defined set of end office switches, defined as clusters.

A group of end office switches (e.g., end offices) connect to an access tandem. The group along with the access tandem is referred to as an access tandem cluster. The access tandem connects the cluster to other networks. In general, each end office also connects to other networks and only uses the access tandem for overflow routes. However, this is not always the case. If there is not enough traffic to justify a direct route, the access tandem may provide the only route to an end office. In the case where there are no direct routes to the end office, the self-learning application server treats the access tandem switch the same as an end office. However, if there is an access tandem route and a direct route, the self-learning application server differentiates between the two routes.

In one embodiment of the present invention, a unidirectional gateway server may communicate directly with both the access tandem switch and the other switches in a local exchange carrier cluster. In addition, the egress edge switch may communicate directly with the local exchange carrier cluster through the access tandem switch, as well as through the other end office switches. The local exchange carrier cluster is used as a vehicle for switching calls to other end office switches that connect to end-users.

It should be appreciated that, in one embodiment of the present invention, there is a two-way communications path between the edge switch on the egress side of the network and the switches in the local exchange carrier cluster. As a result, calls may be switched from the end-user, through the cluster of central office switches, to the edge switch, and then to the network switch. In the one-way trunk group configuration, calls are completed through the unidirectional gateway in one direction. The calls are then forwarded to a Local Exchange Carrier cluster or they may be directed to an alternative switch.

A policy server and a self-learning application server are associated with a network switch including a one-way trunk group. The policy server is queried, by a network switch, to identify an appropriate path for routing a call across the network switch. The policy server is a database containing a set of rules that specify what privileges are associated with a specific calling number or calling number and called number pair. Therefore, a policy server may define how a call is routed through the network. The self-learning application server communicates with the policy server and using self-learning application algorithms, such as artificial intelligence algorithms, learns and defines new policy for the policy server. The policy server may be located inside the network switch or located outside of the network switch across a network. The self-learning application server may also be located within the network switch or outside of the network switch. In addition, the network switch may be a centralized switch with components located in a central unit or the network switch may be distributed across a network and logically connected. The network switch may be a circuit switch, a packet switch, a softswitch or a combination of the foregoing switch types.

A two-way trunk group architecture implementing the method and apparatus of the present invention is shown in FIG. 1. In FIG. 1 a network switch 100 is shown. An end-user 102 is connected to an end office 104. The end office 104 may be a local exchange switch. The end office 104 is connected to an edge switch 106. The edge switch 106 communicates with the network switch 100 through a trunk group denoted as 110. The edge switch hunts across the trunk group 110 in the direction shown by arrow 107. Information (e.g., calls) communicated on the trunk group 110 is processed in gateway server 114. A second edge switch is shown as 108. The second edge switch is directly connected to gateway server 112. The hunt direction across gateway servers 112 and 114 is shown by arrow 119. However, the hunt direction for 114 and 112 may be different depending on the connection negotiation between 106 and 108, respectively.

The various gateway servers 112 and 114 communicate with gateway server 122 across a switching fabric (e.g., an internal or external switch network) 120. Gateway server 122 communicates with edge switch 126 through trunk group 124. The edge switch 126 receives the calls from trunks group 124. A hunt direction 127 is implemented in the edge switch 126. The hunt direction 127 in the edge switch 126 is opposite to the hunt direction (e.g., 121) across gateway server 122. An end user 130 connects to the edge switch 126 through an end office 128.

During operation, when a call is originated from a first end-user 102 to a second end-user 130, end office 104, edge switch 106, and gateway server 114 would be considered an ingress end office, an ingress edge switch and ingress gateway server, respectively. End office 128, edge switch 126, and gateway server 122 would be considered an egress end office, an egress edge switch and egress gateway server, respectively. It should be appreciated that any communication devices on the side of a network switch 100 that is communicating incoming calls are considered ingress devices and any communication devices on the side of the network switch communicating outgoing calls are considered egress devices. Therefore, both sides of the network switch 100 may include ingress and egress devices depending on which function the devices are performing (e.g., receiving incoming calls or communicating outgoing calls).

As calls are processed through the network switch 100, information is requested from a policy server 116 and a self-learning application server 118. It should be noted that in the method and apparatus of the present invention, the self-learning application server 118 may be part of the policy server 116, separate from the policy server 116, external to the switch 100 or any combination of the foregoing. Further, the self-learning application server 118 may be implemented in a centralized architecture or in a distributed architecture.

In the method and apparatus of the present invention, a first end-user 102 dials a second end-user 130. The end office 104 sends an initial address message to an edge switch 106, with a calling party number (e.g., end user 102) and a destination number (e.g., end user 130). The edge switch 106 sends the initial address message to the gateway server 114. The gateway server 114 queries the policy server 116 for a route list. The policy server 116 provides the route list to gateway server 114. The route list instructs gateway server 114 to route the call to gateway server 122. Gateway server 122 sends an initial address message to the edge switch 126. Edge switch 126 sends the initial address message to the end office 128. The end office 128 completes the call to the end user 130. The self-learning application server 118 collects information about the call (e.g., via direct query from the policy server, by analyzing CDRs, etc.). For learnable calls, the self-learning application server 118 caches the number (NPA-NXX) of end-user 102 and associates the number of end-user 102 with trunk group 110 on gateway 114 (e.g., a route). The self-learning application server 118 then updates the routing in the policy server 116, such that trunk group 110 on gateway server 114 is identified as a valid route to the end-user shown as 102.

As such, the policy server and the self-learning application server are able to learn routes and confirm the routes that are currently in use are still valid. For example, the policy server and self-learning application server will learn and validate that for the NPA-NXX associated with end user A 102 uses trunk group 110 on gateway 114. In addition, by completing this call, it is confirmed that for NPA-NXX this route is still a valid route.

As a result of the variety of call types in a conventional system, a number of methods are implemented to manage different call types in accordance with the teachings of the present invention. For example, in a two-way trunk group, methods are presented which address any differences in the hunt order between the edge switch and the network switch. Methods are presented which address wireless calls. Methods are presented which differentiate between primary and overflow routes. Methods are presented which manage Local Number Portability (LNP) calls and methods are presented which enable policy servers implemented in accordance with the teachings of the present invention to update/coordinate with other policy servers.

In one method of the present invention, the hunt direction across the edge switch is identified. The hunt direction across the gateway servers in the network switch is then implemented in a direction that is opposite to the hunt direction across the circuit edge switch. The policy server is then able to learn this hunt direction. Learning the hunt sequence is important in order to minimize glare (e.g., the gateway server requests to terminate a call to the circuit edge switch on the same circuit that the edge switch is requesting to originate a call into the gateway server).

In one embodiment of the present invention, the self-learning application server (e.g., artificial intelligence algorithms) will have a history of calls originating from a given edge switch to a gateway server or gateway servers for a given NPA-NXX. Over time, the self-learning application server can learn in what order the circuit edge switch selects the trunk group within a gateway server or across multiple gateway servers.

During wireless operation, the method and apparatus of the present invention avoids the learning of the wireless number and the associated wireless route. The call detail records associated with all calls are analyzed. In a wireless call, the call detail record will include an Originating Line Identity (OLI) code identifying the call as wireless. The Originating Line Identity code is identified by the policy server and the self-learning application server. As a result, the self-learning application avoids learning the NPA-NXX route based on the OLI code because the caller may be roaming and, therefore, the route may not be a valid return route to the caller.

A method is presented for differentiating between primary and overflow numbers in a two-way trunk group, where primary numbers are associated with a primary route for an end-user calling from a specific number and secondary numbers are associated with a secondary route for an end-user calling from a specific number. When the primary route is full, calls are routed over a secondary route. In one embodiment of the present invention, primary and secondary routes are differentiated by using artificial intelligence algorithms in the self-learning application server to analyze the calling patterns over the various routes to a specific code. Primary routes deliver calls to a smaller number of codes (e.g., one end office) and have higher utilization. Secondary routes deliver calls to a broader set of codes (e.g., multiple end offices) and have lower utilization than the primary route. As a result, the self-learning application server can differentiate the primary and secondary routes and instruct the policy server to select these routes in the appropriate order (i.e., select primary first, use secondary for overflow).

In one method of the present invention, Local Number Portability (LNP) numbers are processed and Location Routing Numbers (LRN) are learned. When a network is operating using LNP technology, a database is queried using the calling party number to determine a location routing number (LRN). The location routing number is used when a number is owned by a carrier and has been ported to another location. On the ingress side, the network switch will query the database (e.g., LNP database), the LNP database will return the LRN and the LRN will be used for routing in the network. Thereafter, the policy server and the self-learning application server initiate algorithms, which identify the LNP number and then learn the LRN number.

In accordance with the teachings of the present invention, a method is presented to synchronize multiple copies of the policy server, prior to, during, and after learning by the self-learning application server. In one embodiment, database synchronization techniques will be used to synchronize the policy server. The synchronization techniques may include any database synchronization technique that provides for concurrency of databases.

Figure 2:
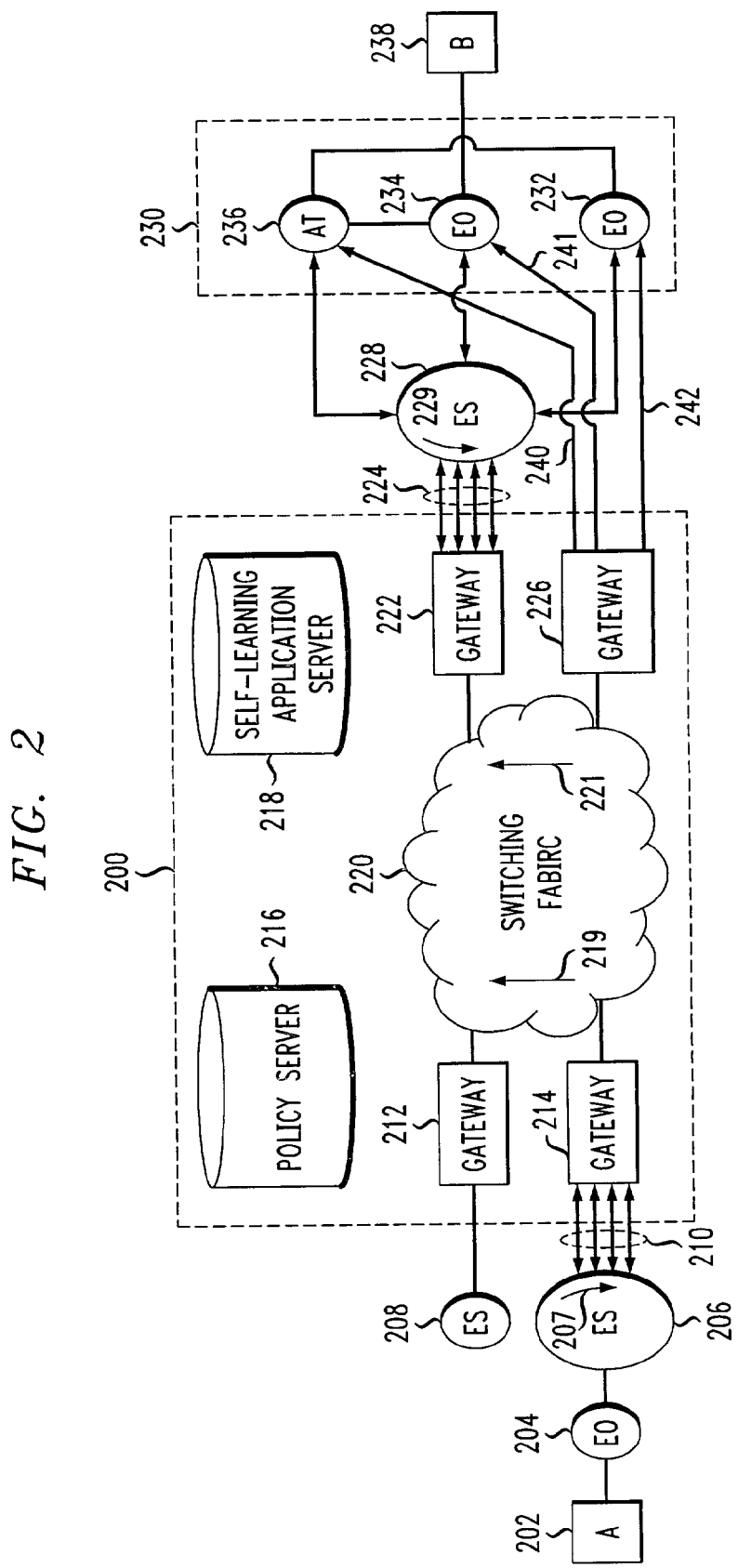
FIG. 2 displays a switch including a one-way trunk group, which implements the method and apparatus of the present invention.

A one-way trunk group architecture implementing the method and apparatus of the present invention is shown in FIG. 2. In FIG. 2 a network switch 200 is shown. An end-user 202 is connected to an end office 204. The end office switch 204 may be a local exchange switch. The end office switch 204 is connected to an edge switch 206. The edge switch 206 communicates with the network switch 200 through a trunk group denoted as 210. Edge switch 206 hunts across hunt group 210 in a direction denoted by arrow 207. Information communicated on trunk group 210 is processed in gateway server 214. In addition, an end office shown as 208 is directly connected to a gateway server 212. The hunt direction for the gateway server 214 is shown by arrow 219.

Gateway servers 212 and 214 communicate with gateway servers 222 and 226 across switch fabric (e.g., an internal or external switching network) 220. Gateway servers 222 and 226 receive the calls from gateway servers 212 and 214 and process the calls. In one embodiment of the present invention, gateway server 222 processes calls in two directions and gateway server 226 processes calls in one direction (e.g., one-way trunk group).

The gateway server 222 communicates with edge switch 228 across trunk group 224. Gateway server 226 provides access to a local exchange cluster 230. The local exchange cluster 230 includes an access tandem switch 236 and end offices 232 and 234. Gateway server 226 may communicate directly with access tandem 236, end office 234 and end office 232. In addition, gateway server 226 may communicate with end office 232 and end office 234 through access tandem 236. Gateway server 222 may also communicate through edge switch 228 to access tandem 236, end office 232 and end office 234. A communication pathway is shown through end office 234 to end user 238.

As calls are processed through the network switch 200, information is requested from a policy server 216 and a self-learning application server 218. It should be noted that, in the method and apparatus of the present invention, the self-learning application server 218 may be part of the policy server 216, separate from the policy server 216 or external to the switch 200.

In the method and apparatus of the present invention, an end-user 202 dials a second end-user 238. The end office 204 sends an initial address message to the edge switch 206 with a calling party number (e.g., number of end user 202) and a destination number (e.g., number of end user 238). The edge switch 206 sends an initial address message to a gateway server 214. The gateway server 214 queries the policy server 216 for a route list. The policy server 216 may not have the route to the second end-user 238. Therefore, the policy server creates a trial and error list, caches the state of the list, and forwards the list to the gateway server 214. The gateway server 214 tries the routes on the routing list and indicates failures and successes. The self-learning application server 218 learns the routes and stores which routes are valid and which routes fail. For example, the gateway 214 may attempt to complete the call through gateway 226 on trunks 240, 241 and 242. Depending on which trunks (e.g., 240, 241 and 242) complete the calls, the self-learning application server 216 will learn valid routes. In addition, by analyzing calling patterns/number of reachable codes, the self-learning application server 216 will also learn the primary, secondary and tertiary routes.

During the trial and error method of the present invention, the policy server returns a route list with several numbers and then one known route. The known route is positioned at the bottom (i.e., last route chosen) of the list. In subsequent calls to the same NPA-NXX, the known route would be tried if all the initial routes are unsuccessful. This allows the self-learning application server to use live traffic to learn routes via trial and error, while minimizing the number of calls that cannot be completed. If a route is unavailable, then the remainder of the list may be tried with the success or failure being reported back to the policy server. As a result, complex algorithms may be implemented, which test routes and determine a valid route or the best routes.

A number of methods are implemented in accordance with the teachings of the present invention to manage different call types. For example, in a one-way trunk system, methods are presented which enable calls to be connected efficiently. Methods are presented to differentiate between access tandem routes and direct routes. Methods are implemented to address failures due to vacant codes. Methods are implemented to keep state information current. Methods are implemented to enable the gateway server to indicate success/failure to the policy server. Methods are presented which enable the policy server to update and coordinate with other policy servers. Methods are presented which enable the policy server to manage network churn.

In one embodiment of the present invention, Automated Intelligent Networking (AIN) may be implemented in a network. As a result, a network switch may find a way to complete a call even though it is not the most efficient route for completing the call. In the present invention, artificial intelligence and caching are used to limit the overflow routes. Therefore, there are fewer options for completing calls. This will result in a decrease in the number of inefficient routes.

The trunk group, which carries overflow routes, will serve many more NPA-NXX codes than a trunk group that carries direct routes. Therefore, for each NPA-NXX code, all the trunk groups that can successfully route to that NPA-NXX are identified. An analysis is then made of the quantity of codes reachable via each trunk group. The trunk groups are then ordered in sequence based on the quantity of reachable codes. The trunk group with the fewest reachable codes is designated the primary route for the NPA-NXX. The trunk group with the next fewest reachable codes is designated the secondary route, and so forth, for all the trunk groups that can reach the NPA-NXX.

In a method of the present invention, an algorithm is implemented to identify network rearrangements by monitoring for call failures due to vacant code. Artificial intelligence or complex caching techniques are used to monitor the frequency of vacant code failures for an NPA-NXX vs. the frequency of successful call completion for a route. If the self-learning application determines that calls to an NPA-NXX are failing due to vacant code more frequently than they should, it determines that there may have been a network rearrangement and re-learns the route to the NPA-NXX using the techniques described previously.

The self-learning application maintains a history of how many times a call to an NPA-NXX has tried a given route and, of those attempts, how many times it has been successful and how many times it has failed and when it has failed, what has been the cause of the failure. The cause of the failure may be indicated in a code which indicates network busy or a code, which indicates the end-user is busy, etc. Vacant code can mean that the end-user dialed a number that is not in service or that the destination NPA-NXX cannot be reached through that route and, therefore, should be removed from the route list and the route to the NPA-NXX re-learned. The self-learning application must monitor call success and failure to differentiate between calls to numbers that are not in service versus calls to valid numbers that are incorrectly routed.

The state of information in the policy server is identified and maintained by the self-learning application server in the method and apparatus of the present invention. Data is correlated to keep the state of information. For example, the failure of different routes is analyzed. The routing tables consist of an NPA-NXX mapping to a list of routes which have been successful and the degree of success. The list is ordered from most successful to least successful. The routing tables are updated with each call completed and not completed to an NPA-NXX. Also, the routing tables are updated as the NPA-NXX originates calls and comes into the network using a new route which was previously unidentified.

Figure 3:
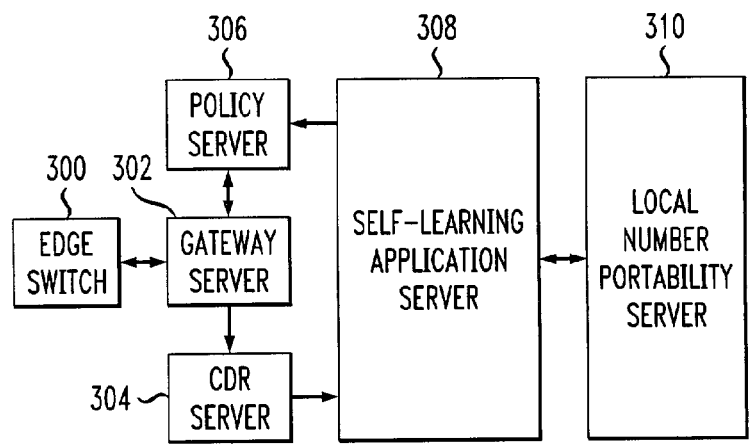
FIG. 3 displays a call detail record and provisioning architecture implemented in accordance with the teachings of the present invention.

In FIG. 3, a call detail record provisioning architecture is shown. In FIG. 3, an edge switch 300 is in communication with a gateway 302. The gateway 302 accesses both a CDR (call detail record) server 304 and a policy server 306. The policy server 306 connects to a self-learning application server 308. In addition, the self-learning application server is in communication with the CDR server 304 and receives call detail records from the CDR server 304. Lastly, the self-learning application server 308 is in communication with a Local Number Portability server 310.

In one embodiment of the present invention, the gateway server 302, the policy server 306, and the CDR server 304 may comprise the network switch, while the edge switch 300, self-learning application server 308, and local number portability server 310 may all reside outside the switch as stand-alone elements. In another embodiment, the self-learning application server 308 may reside in the network switch with the gateway server 302, the policy server 306, and the CDR server 304. In a third embodiment, the various elements may all exist as stand-alone elements. In addition, various combinations of components may be inside the network switch or outside of the network switch, without departing from the scope of the present invention.

In one method of the present invention, the gateway server 302 writes call detail records for incoming calls into the CDR server 304. The call detail records may include ANI, JIP, Dialing Number (DN), OLI, Trunk Group, etc. The self-learning application server 308 accesses the call detail records from the CDR server 304. The self-learning application server 308 communicates (e.g., a database query) with the local number portability server 310 for ported ANI's. The self-learning application server 308 uses caching and artificial intelligence to learn which codes are reachable via which trunk groups. The self-learning application server 308 then provisions the learned routes into the policy server 306.

Figure 4:
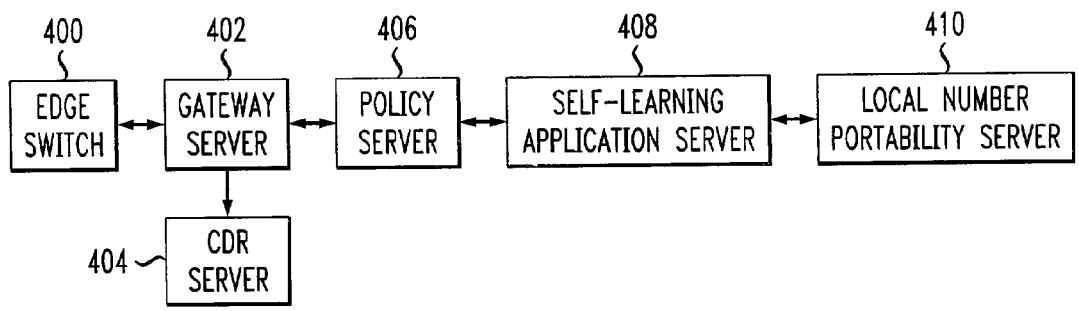
FIG. 4 displays a database query-based architecture implemented in accordance with the teachings of the present invention.

In FIG. 4, an edge switch 400 may communicate with a gateway server 402. The gateway server 402 is in communication with a CDR server 404 and a policy server 406. The policy server 406 connects to a self-learning application server 408 which may access a local number portability server 410.

In the architecture shown in FIG. 4, a database query may be made on every call by the policy server 406 to the self-learning application server 408. The self-learning application server 408 queries the Local Number Portability (LNP) server 410 for ported ANI's. The self-learning application server 408 responds with routing information. The self-learning application server 408 uses caching and/or artificial intelligence to learn which codes are reachable through each trunk group.

Figure 5:
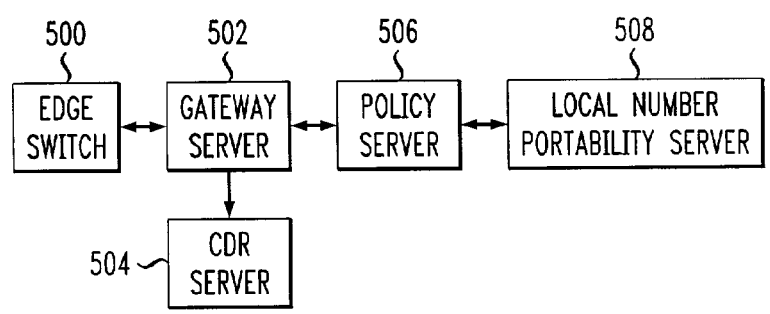
FIG. 5 displays a policy server-based architecture implemented in accordance with the teachings of the present invention.

FIG. 5 displays a policy server-based architecture implemented in accordance with the teachings of the present invention. In FIG. 5, an edge switch 500 may communicate with a gateway server 502. The gateway server 502 is in communication with a CDR server 504 and a policy server 506. The policy server 506 connects to a local number portability server 508. In the policy server-based application of FIG. 5, a self-learning application may be included in the policy server 506. As a result, the policy server may use caching and artificial intelligence to learn which codes are reachable via trunk groups (e.g., routing information). The policy server updates its routing tables based on caching and artificial intelligence learning (i.e., learned information).

Figure 6:
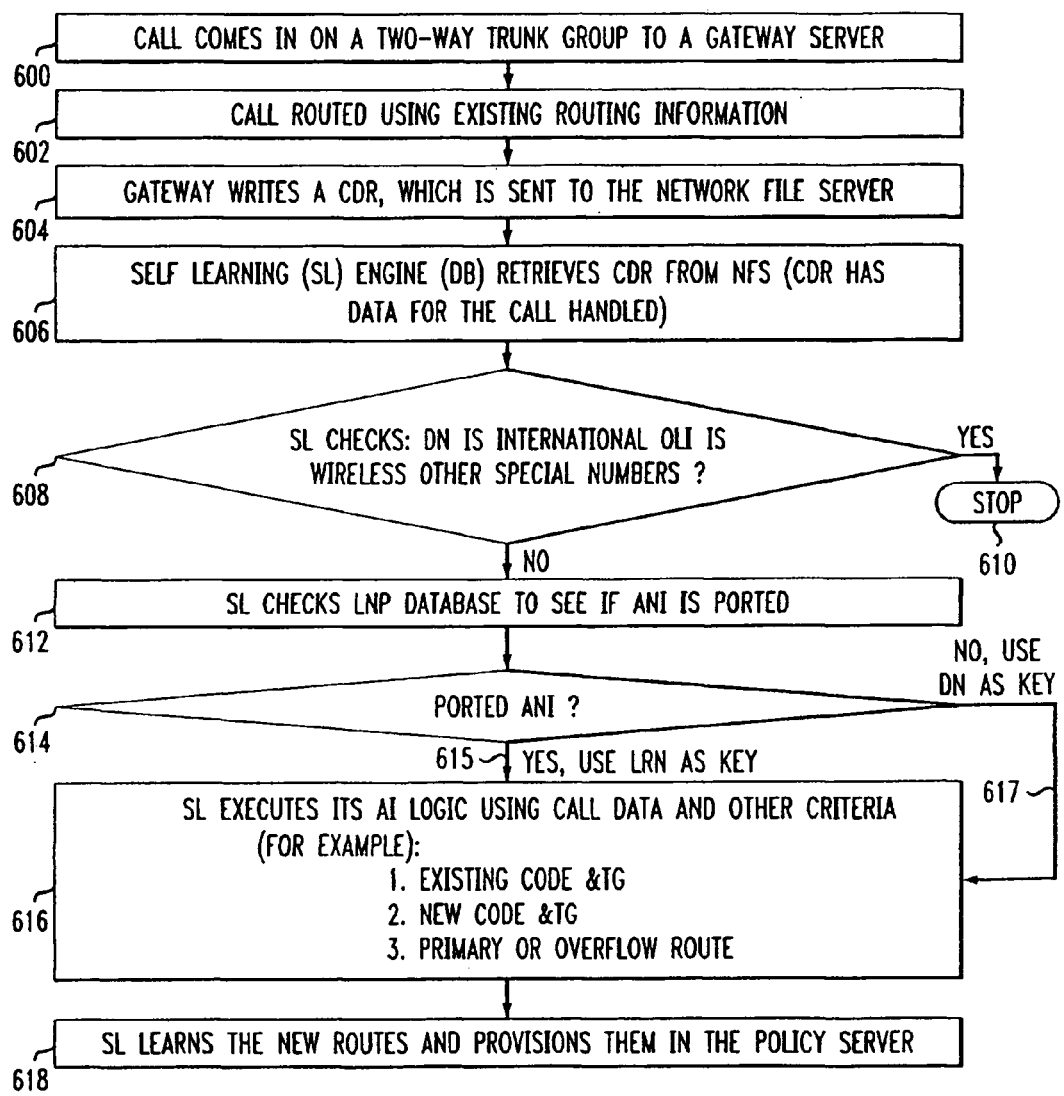
FIG. 6 displays a flow chart of a self-learning method for a two-way trunk group, implemented in accordance with the teachings of the present invention.

FIG. 6 displays a flow chart of a self-learning method for a two-way trunk group. A call comes into a two-way trunk group as shown at 600. The call is routed using existing routing information stored in the policy server as shown at 602. The gateway server creates a call detail record and sends the call detail record to the CDR server as shown at 604. A self-learning application server retrieves the call detail information from the network file server, as shown at 606. The self-learning application may check for a number of special characters that would signify the need for special processing as shown at 608. Examples of the special characters include OLI characters for wireless calls or a destination address that is international. If there is a special character, the process is stopped as shown at 610. Stopping the method (e.g., 610) corresponds to just processing the call and not learning the route. However, if there is no special character, the self-learning application checks the LNP database to see if an ANI is ported as shown at 612. A decision is made as to how to handle a ported ANI, as shown at 614. If the ANI is ported, the LRN is used as a key, as shown as 615. If the ANI is not ported, the DN is used as a key, as shown at 617. The self-learning application then proceeds, as shown at 616, to execute the artificial intelligence logic using the call data and other criteria, such as (1) existing codes and trunk groups; (2) new codes and trunk groups; (3) primary codes and overflow routes, etc. Lastly, the self-learning application server learns the new routes and provisions these routes in the policy server.

Thus, the present invention has been described herein with reference to a particular embodiment for a particular application. Those having ordinary skill in the art and access to the present teachings will recognize additional modifications, applications and embodiments within the scope thereof.

It is, therefore, intended by the appended claims to cover any and all such applications, modifications and embodiments within the scope of the present invention.

What is claimed is:

1. A network switch comprising:
an ingress port receiving an incoming call;
a first server storing routing information;
a switching fabric coupled to the ingress port and coupled to the first server, the switching fabric generating a switched call by switching the incoming call in response to the routing information, wherein the switched call is from a first end-user to a second end-user;
an egress port coupled to the switching fabric, the egress port communicating an outgoing call in response to the switched call; and
a second server coupled to the first server within the network switch, the second server determining whether the incoming call is a wireless call, and if the incoming call is not a wireless call, then generating learned routing information in response to the routing information stored in the first server and in response to information about a trunk group that was used to route the switched call, as the incoming call is switched, to a dialing number found in a call detail record associated with the switched call, wherein the learned routing information comprises a new path for routing a call and the second server communicating the learned routing information to the first server to update the routing information with the learned routing information.

2. The switch as set forth in claim 1, wherein the switch is implemented with a centralized architecture.

3. The switch as set forth in claim 1, wherein the switch is implemented with a distributed architecture.

4. The switch as set forth in claim 1, wherein the learned routing information is learned by using simple caching.

5. The switch as set forth in claim 1, wherein the learned routing information is learned by using complex caching.

6. The switch as set forth in claim 1, wherein the learned routing information is learned by using artificial intelligence.

7. The switch as set forth in claim 1, wherein the first server is a policy server.

8. The switch as set forth in claim 1, wherein the second server is a self-learning application server.

9. The switch as set forth in claim 1, wherein the egress port is coupled to a one-way trunk group.

10. A method of operating a network switch comprising:
receiving an incoming call;
storing routing information at a first server;
generating a switched call by switching the incoming call in response to the routing information, wherein the switched call is from a first end-user to a second end-user;
communicating an outgoing call in response to the switched call;
determining whether the incoming call is a wireless call;
if the incoming call is not a wireless call, then generating and storing learned routing information via a second server coupled to the network switch in response to the routing information and in response to information about a trunk group that was used to route the switched call, as the incoming call is switched, to a dialing number found in a call detail record associated with the switched call, wherein the learned routing information comprises a new path for routing a call; and
updating the routing information stored in the first server with the learned routing information.

11. A network switch comprising:
a switching fabric switching calls, wherein the calls are from a first end-user to a second end-user; and
a server coupled to the switching fabric within the network switch, the server determining whether an incoming call of the calls is a wireless call, and if the incoming call is not a wireless call, then learning routes by analyzing information about a trunk group that was used to route each switched call of the calls that is not a wireless call, as the incoming call is switched, to a dialing number found in a call detail record associated with the calls in response to the switching fabric switching the calls, wherein the routes that are learned comprise new paths for routing a call and the server communicating the routes that are learned with a different server to update routing information stored in the different server with the routes that are learned.

12. The switch as set forth in claim 11, wherein the switch is implemented with a centralized architecture.

13. The switch as set forth in claim 11, wherein the switch is implemented with a distributed architecture.

14. The switch as set forth in claim 11, wherein the server learns the routes by using simple caching.

15. The switch as set forth in claim 11, wherein the server learns the routes by using complex caching.

16. The switch as set forth in claim 11, wherein the server learns the routes using artificial intelligence routines.

17. The switch as set forth in claim 11, wherein the server is a self-learning application server.

18. The switch as set forth in claim 11, wherein the switching fabric is coupled to a one-way trunk group and switches calls out of the one-way trunk group.

19. The switch as set forth in claim 11, wherein the switching fabric is a packet-switching network.

20. The switch as set forth in claim 11, wherein the switching fabric is a circuit-switching network.

21. The switch as set forth in claim 11, wherein the switch is a softswitch.

22. A method of operating a network switch comprising:
switching calls, wherein the calls are from a first end-user to a second end-user;
determining whether an incoming call of the calls is a wireless call;
if the incoming call is not a wireless call, then learning routes via a server that analyzes information about a trunk group that was used to route each switched call of the calls that is not a wireless call, as the incoming call is switched, to a dialing number found in a call detail record associated with the calls coupled to the network switch in response to switching the calls, wherein the routes that are learned comprise new paths for routing a call; and
updating routing information stored on a different server with the routes that are learned.

* * * * *